Figure 1:
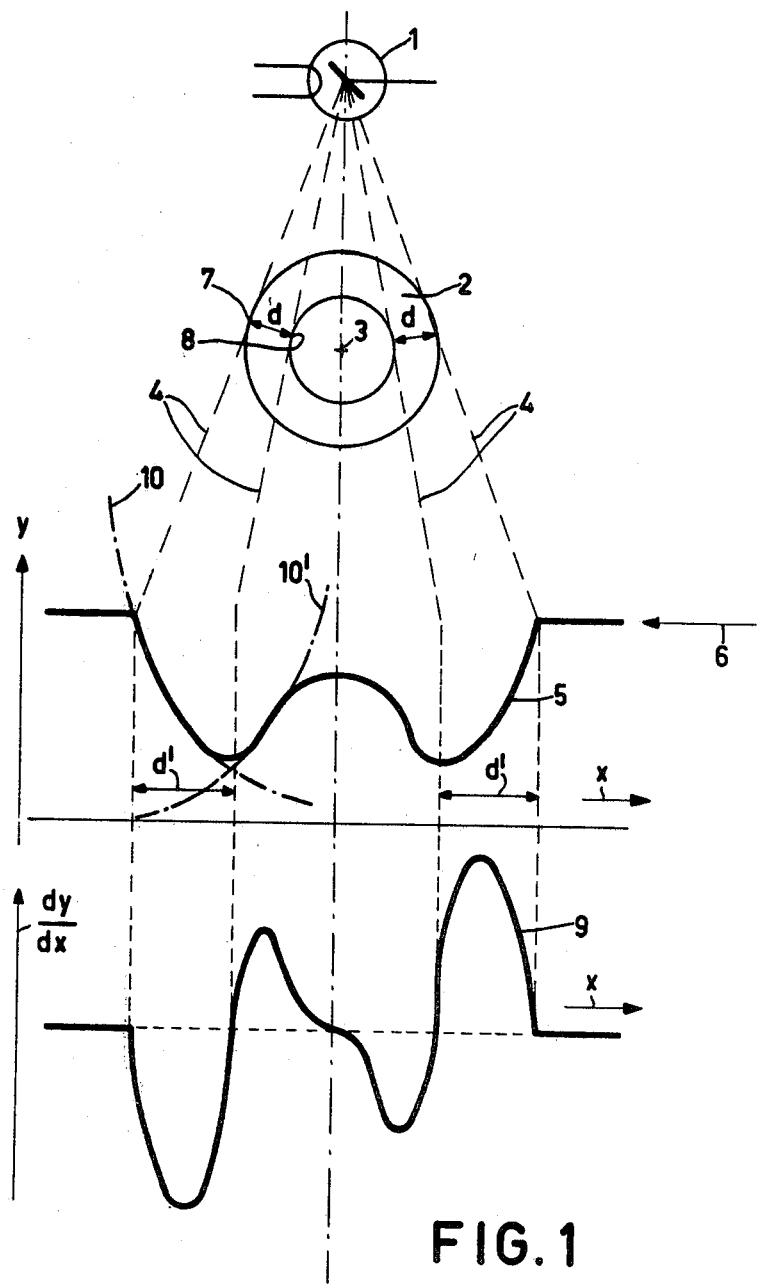

United States Patent [19]

Gehm

[11] 4,330,835
[45] May 18, 1982

[54] METHOD AND APPARATUS FOR DETERMINING THE INTERNAL DIMENSION OF HOLLOW BODIES

[75] Inventor: Ulrich Gehm, Norderstedt, Fed. Rep. of Germany

[73] Assignee: U.S. Philips Corporation, New York, N.Y.

[21] Appl. No.: 76,888

[22] Filed: Sep. 19, 1979

[30] Foreign Application Priority Data

Sep. 20, 1978 [DE] Fed. Rep. of Germany ....... 2840819

[51] Int. Cl.³ .............................................. G01N 23/00
[52] U.S. Cl. ................................ 364/560; 250/358 R; 364/527; 358/107
[58] Field of Search ............... 364/560, 563, 561, 527; 250/312, 358 R, 358; 358/107, 111

[56] References Cited

U.S. PATENT DOCUMENTS

| | | | |
|---|---|---|---|
| 3,673,394 | 6/1972 | Hartmann | 364/560 |
| 3,784,827 | 1/1974 | Calhoun | 250/358 X |
| 3,919,467 | 11/1975 | Peugeot | 358/111 |
| 3,950,613 | 4/1976 | Macovski | 358/111 X |
| 3,955,086 | 5/1976 | Tsujii et al. | 250/358 R |
| 3,958,078 | 5/1976 | Fowler et al. | 358/111 X |
| 3,990,067 | 12/1976 | Foster | 250/312 |
| 4,047,029 | 9/1977 | Allport | 250/358 R X |
| 4,049,954 | 9/1977 | Vieira et al. | 364/560 |
| 4,063,074 | 12/1977 | Wagner | 364/527 X |
| 4,064,440 | 12/1977 | Roder | 250/359 |
| 4,095,106 | 6/1978 | Wallace | 250/358 R |
| 4,119,846 | 10/1978 | Outhwaite et al. | 250/358 R X |
| 4,123,786 | 10/1978 | Cramer | 358/111 X |
| 4,125,858 | 11/1978 | Hounsfield | 358/111 X |
| 4,163,991 | 8/1979 | Burrig | 358/111 |
| 4,191,890 | 3/1980 | Geluk | 358/111 X |
| 4,210,812 | 7/1980 | Ando et al. | 358/111 X |
| 4,216,499 | 8/1980 | Kunze et al. | 358/111 |

Primary Examiner—Edward J. Wise
Attorney, Agent, or Firm—Paul R. Miller

[57] ABSTRACT

For the testing of notably deep-drawn tubes during manufacture it is important that the thickness of the tube can be checked. When the tubes are heated during manufacture, this measurement cannot be performed by means of a device where the X-ray source and the filter are to be arranged inside the tube. In accordance with the invention, the radiation source is arranged outside the tube and this tube is tangentially irradiated. The maximum values and minimum values of the radiation relief thus generated in a relationship perpendicularly to the tube axis indicate the position of the outer wall and the inner wall of the tube. The wall thickness of the tube can be derived therefrom.

15 Claims, 3 Drawing Figures

METHOD AND APPARATUS FOR DETERMINING THE INTERNAL DIMENSION OF HOLLOW BODIES

The invention relates to a method of determining the internal dimension of elongated hollow bodies, notably tubes, by means of X-rays or gamma rays, and to an apparatus for performing this method.

For the production test of hollow bodies, the dimensions inside the hollow body are often important. However, often this dimension cannot be measured without damaging of the body. For example, for the production testing of deep-drawn tubes there is a problem in that the internal dimensions of the tubes, and notably the wall thickness thereof, must be continuously checked. An additional difficulty consists in that the tubes are red hot during the manufacture, so that the tube cannot be checked by means of an X-ray source introduced into the tube in known manner.

Therefore, the invention has for its object to provide a method of the described kind which enables determination of the internal dimension of a hollow body, notably a tube, without the X-ray source or gamma source or the converter which converts the X-rays or gamma rays into an optical or electrical signal being arranged inside the tube.

In order to achieve this object, a method of the kind set forth in accordance with the invention is characterized in that the hollow body is irradiated by a radiation source which is arranged outside the body, the intensity variation of the radiation being measured on an opposite situated side of the hollow body along a line which is directed transversely of an axis of the body and which extends in a plane through the radiation source, minimum intensity values being localized at this area.

In practice the minimum radiation intensity behind a hollow body cannot be observed well enough. In such as case, however, a further elaboration of the method enables an evaluation by determination of the first derivation of the intensity variation and by measuring the position or the distance of the zero positions of the first derivation.

A further possibility of accurately determining the position of a minimum value in accordance with the invention consists in that the intensity variation on both sides of the minimum value is each time approximated by an exponential function, the location of the minimum value being determined as the point at which the exponential functions thus obtained have the same value.

An embodiment in accordance with the invention will be described in detail hereinafter, by way of example, with reference to the accompanying diagrammatic drawings.

Figure 2:
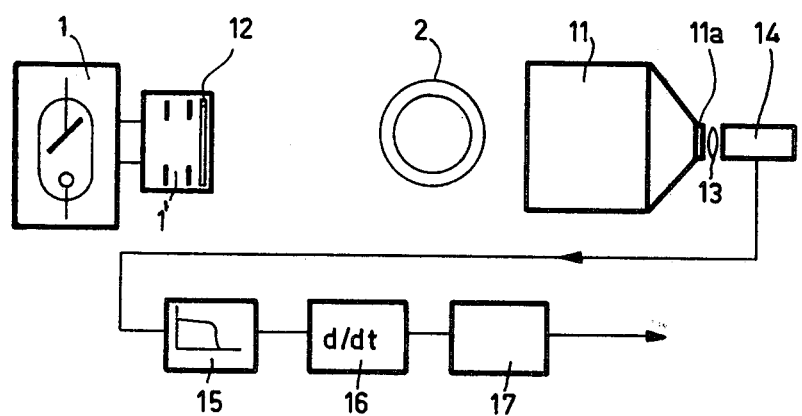
Figure 3:
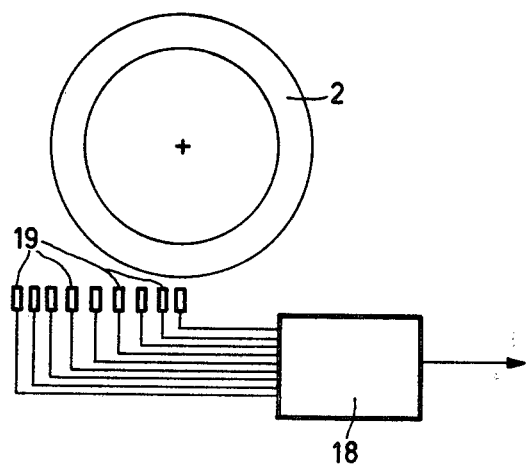

FIG. 1 diagrammatically shows the beam path in a device in accordance with the invention, the variation of the intensity, and the variation of the differential quotient of the intensity, FIG. 2 shows an embodiment of a device for performing the method, and FIG. 3 shows a further embodiment.

FIG. 1 shows an X-ray source 1 and an object 2, a longitudinal axis 3 of said object being directed perpendicularly to the plane of the drawing. Broken lines 4 denote X-rays which penetrate the tube, the boundaries of which are tangentially irradiated. A radiation relief 5 thus formed is converted into an electrical signal by a radiation converter (not shown) at a horizontal straight line which is denoted by an arrow 6.

The variation of the intensity y of the radiation as a function of the location x on the horizontal straight line is given by the curve 5. The part of the radiation which reaches the converter without having passed through the object has a maximum intensity. As soon as the radiation encounters an outer wall 7 of the tube and passes further through the tube wall, the radiation intensity decreases. A minimum value is reached when the radiation just touches an inner wall 8 of the tube. Subsequently, the intensity y increases in the direction of the axis 3 of the tube. On the other side of the axis, the intensity varies symmetrically with the variation described thus far.

The part of the attenuation curve which is situated between the minimum value and the point at which the intensity of the maximum value starts to decrease is denoted by the reference d'. There is a linear relationship between the value d' and the tube wall thickness d, at least if the distance between the tube and the radiation source is large in comparison with the wall thickness of the tube.

For physical reasons, the minimum value of the curve does not exhibit an acute transition, but extends over a given zone. Two possibilities will be described for determining the correct location of the minimum value.

According to a first possibility, the differential quotient of the intensity y is formed as a function of the location x; this results in a curve 9. At the location of the minimum values and the maximum values a zero crossing occurs in the curve 6. The path d' is thus determined by the distance between two zero crossings, which can be very accurately measured. Taking into account the enlargement factor, the wall thickness d of the tube 2 can be derived therefrom.

A second possibility is based on the recognition of the fact that the ends of the intensity curve 5 on both sides of the minimum d follows an exponential function of the type $y = a \cdot e^{bx}$, deviations occurring only at the area of the minimum value. Therefore, this part of the curve 5 can in principle be replaced by two exponential functions, which results in the curves 10 and 10' which are denoted by stroke-dot lines. The coefficients of the exponential functions can then be obtained in accordance with the formulas $$b = \frac{Ex_i \, \ln y_i - \frac{1}{n}(Ex_i)\, E\ln y_i}{Ex_i{}^2 - \frac{1}{n}(Ex_i)^2} \quad (1)$$

$$a = \exp\left[\frac{E\ln y_i}{n} - b\frac{Exi}{n}\right] \quad (2)$$

Therein, $y_i$ is the intensity of the radiation at the area $x_i$, where $i = 1, 2 \ldots n$, n being the number of locations where the measured intensity is taken into account for determining the exponential curve. The point of intersection of the two exponential curve thus determined corresponds substantially to the location of the minimum value. This can be calculated by means of the equation $$x' = (\ln a1/a2)/(b2 - b1) \quad (3)$$

Therein, b1, a1 are the coefficients of the one exponential curve calculated according to the equations (1) and (2) (for example, the exponential curve 10 in FIG. 1), and a2 and b2 are the coefficients of the other exponential curve (10').

FIG. 2 diagrammatically shows a device for performing the method which utilizes the first possibility for accurate determination of the minimum values. The device comprises an X-ray source 1, the radiation of which is stopped by an aperture 1' which is arranged in front of the source so that an object to be measured is just enclosed and that only a very small part of the radiation is not incident on the tube and reaches the entrance screen of an X-ray image intensifier 11. Between the X-ray source 1 and the object 2 there is provided a filter 12 which is made of such a material and which has a thickness such that the object on the one hand is sufficiently penetrated by the X-radiation, while on the other hand the parasitic radiation component is small.

The X-ray image intensifier 11 forms a visible image on the basis of the radiation relief of the tube 2 which is formed on the entrance side and this image appears on the exit screen 11a in intensified form. The brightness-intensified exit screen image is picked up by a television camera 14 by a suitable optical system 13. The television camera is arranged so that the line direction extends perpendicular to an axis of the object 2 (thus, the line direction extends vertically in FIG. 2), while the vertical direction of the scanned image extends parallel to the axis of the object 2 (perpendicularly to the plane of the drawing). The video signal generated by the television camera is applied to a lowpass filter 15 which removes high-frequency noise components from the video signal, so that a smooth signal according to the curve 5 of FIG. 1 is produced. The output of the lowpass filter 15 is connected to a differentiator 16, on the output of which a signal appears whose variation in time corresponds to variation in space (in the direction x) of the curve 9. The distance in time between two zero crossings in the output signal, therefore, is proportional to the spatial distance between two zero crossings in the curve 9. The distance in time between the zero crossings is determined by the circuit 17. To this end, a time marking generator may be provided or a circuit which comprises a gate which is opened by the first zero crossing and subsequently conducts pulses of the correct, accurately known frequency to a counter and which is closed by the next zero crossing. The counter position then indicates the distance in time between the zero crossings of the differentiated video signal or the wall thickness. The output signal of the circuit 17 could be compared with an electrical signal representing the reference value of the zero crossings or the wall thickness and could serve as an alarm signal in the case of a deviation. When the device shown is used during the production process, however, the parameters controlling the wall thickness of the tube 2 can also be directly controlled thereby.

The position of the outer tube wall need not necessarily be determined by the X-rays. It can alternatively be measured by means of visible light, the light source then being mechanically coupled to the X-ray source and the light sensor being mechanically coupled to the X-ray detector (11).

As appears notably from FIG. 1, the wall thickness d can each time be measured in only two locations of a tube by means of the method in accordance with the invention. In order to enable measurement of the wall thickness also at other locations, the tube 2 must be rotated around the central axis 3 for a predetermined angular amount. Subsequently, the tube must be displaced perpendicularly to the plane of the drawing. In the case of a production method where the wall thickness is uniform along the tube circumference but can be irregular in the direction of the tube, however, rotation of the tube can be dispensed with.

The device which is diagrammatically shown in FIG. 3 enables determination of the wall thickness in that the intensity minimum value is measured as a point of intersection of two exponential curves. The X-ray source, the apertures and the filter have been omitted for the sake of clarity. A number of nuclear radiation detectors which are situated on the other side (with respect to the radiation source not shown) of the tube 2 at the same distance from each other supply signals which correspond to the intensity of the radiation at the area of various nuclear radiation detectors (in comparison with the dimensions of the tube, the nuclear radiation detectors are substantially smaller than shown in the drawing). The signals are treated (in a manner not shown) and applied to a digital computer 18 which calculates the two exponential functions therefrom in accordance with the equations (1) and (2) and which subsequently calculates the point of intersection thereof in accordance with the equation (3). The values $x_i$ are then predetermined by the spatial arrangement of the nuclear radiation detectors, while the values $y_i$ are determined by the value of the signal of the nuclear radiation detector at the area $x_i$. The output signal of the computer 18 can also be used for controlling the production process or for generating an alarm signal.

It is not absolutely necessary, but effective, for all nuclear radiation detectors to be situated at the same distance from each other. Moreover, it is not necessary either, as is shown in FIG. 3, to cover the total area of the tube by the nuclear radiation detectors. It is sufficient when a group of nuclear radiation detectors is arranged on both sides of the point where the ray tangent to the inner diameter of the tube 2 must arrive if the tube has the prescribed inner diameter, each of said groups each time determining the measuring values for determining one of the associated exponential functions.

It is not necessary either for the nuclear radiation detectors to be arranged on an arc of a circle, for example, around the focus of the radiation source. However, it is important that the detectors are arranged on one line which is situated in a plane which extends perpendicularly to the central axis of the tube and preferably through the X-ray source.

If necessary, the outer diameter can be determined by determining the position of the first nuclear radiation detector (viewed from the center) which is exposed to the full X-ray dose. As has already been stated, however, the outer diameter can also be determined by means of visible light.

The determination of the position of the inner wall of the tube as a point of intersection of two exponential functions can also be realized by means of a device which, like the device shown in FIG. 2, continuously supplies a signal which corresponds to the intensity of the radiation on the other side of the tube. This signal must be sampled at predetermined time intervals and must possibly be quantized. The determination of the radiation intensity by means of nuclear radiation detectors offers an advantage over a device comprising an image intensifier and a television camera in that better adaption to the energy of the X-rays to be detected is achieved.

The method in accordance with the invention cannot only be used for steel tubes, but also for tubes made of any other chemically homogeneous material, for example, a synthetic material or wire. Cylindrical hollow bodies which have a section other than the circular section shown in the drawing, for example, an elliptical section, can also be measured.

What is claimed is:

1. A method of determining dimensions of elongated hollow bodies by X-rays or gamma rays comprising the steps of irradiating a hollow body with a radiation source being outside of said hollow body, and measuring an intensity variation at an opposite side of said hollow body from said radiation source by carrying out measurements along a line transverse to an axis through said hollow body and extending in a plane through said radiation source transverse of said axis, wherein minimum intensity values representative of edge locations of said hollow body are provided in said plane, the distance between said minimum intensity values representing said dimensions of said hollow body.

2. A method according to claim 1, wherein a first derivative of said variation is determined, and positions of zero crossing of said line by said first derivative are determined.

3. A method according to claim 1, wherein said intensity variation is approximated by exponential functions at opposite sides of said minimum intensity values, said exponential functions having the same value at locations of said minimum value.

4. A device for determining dimensions of hollow bodies by X-rays or gamma rays comprising a radiation source, a hollow body being examined by radiation from said source, means for image intensifying said radiation from said hollow body, TV means for reading an image from said image intensifying means, said TV means scanning said image intensifying means along lines perpendicular to a longitudinal axis of said hollow body, circuit means for determining zero crossings of image intensity on a line perpendicular to said longitudinal axis, said circuit means supplying signals corresponding to one of time distance between a zero crossing and beginning of said line or time distance between two zero crossings, and differentiator means for applying video signals from said TV means to said circuit means.

5. A device for determining dimensions of elongated hollow bodies by X-rays comprising an X-ray source, means for limiting X-rays from said source, an elongated hollow body being examined by said X-rays, means for detecting X-rays from said hollow body, said detecting means including a location sensitive, line shaped X-ray detection device, and circuit means for localizing minimum values in a variation of detected radiation in the line direction of said detecting means to measure dimensions of said hollow body.

6. A device according to claim 5, wherein said detecting means include a plurality of nuclear radiation detectors arranged along a straight line perpendicular to a longitudinal axis of said hollow body, and means responsive to output signals from said detectors for approximating intensity variation along said straight line by exponential functions, said means determining positions on said line where said exponential functions have the same value.

7. A device for determining dimensions of an elongated hollow body comprising a radiation source, aperture means for limiting radiation from said source, means for filtering unwanted portions of said radiation, an elongated hollow body to be examined, said elongated body extending in a direction perpendicular to said radiation, and means for measuring intensity variations of said radiation passing through said hollow body wherein minimum intensity values are representative of edge locations of said hollow body.

8. A device according to claim 7, wherein said measuring means includes an image intensifier, means for exhibiting an intensified image, and means for reading said intensified image.

9. A device according to claim 8, wherein said reading means includes TV means for exhibiting said intensified image, and means responsive to said TV means for establishing minimum and maximum values of said intensity variations.

10. A device according to claim 9, wherein said establishing means includes a low-pass filter, means for differentiating an output of said low-pass filter, and circuit means responsive to said differentiating means for measuring zero crossings of intensity values over a line perpendicular to the longitudinal axis of said elongated hollow body.

11. A device according to claim 10, wherein said circuit means includes a time marking generator.

12. A device according to claim 10, wherein said circuit means includes a gate responsive to zero crossings and counter means responsive to said gate for indicating time distance between subsequent zero crossings.

13. A device according to claim 7, wherein said radiation source is an X-ray source.

14. A device according to claim 7, wherein said means for measuring intensity variations includes a plurality of nuclear radiation detectors situated in a line, and means responsive to said detectors for determining positions of said minimum intensity values.

15. A device according to claim 14, wherein said minimum intensity values occur at positions of equality between two exponential functions.

* * * * *